United States Patent [19]
Oldham et al.

[11] 3,957,642

[45] *May 18, 1976

[54] PIVOTABLE FLUID DIVERTER FOR RECIRCULATION SYSTEM

[75] Inventors: Robert R. Oldham; John H. Wooddell, both of Sidney, Ohio

[73] Assignee: Robert R. Oldham, Inc., Sidney, Ohio

[ * ] Notice: The portion of the term of this patent subsequent to Feb. 5, 1991, has been disclaimed.

[22] Filed: Oct. 29, 1973

[21] Appl. No.: 410,613

Related U.S. Application Data

[63] Continuation-in-part of Ser. No. 351,273, April 16, 1973, Pat. No. 3,789,986.

[52] U.S. Cl. .............................. 210/121; 210/151; 210/194
[51] Int. Cl.² ........................................ B01D 23/16
[58] Field of Search ............ 210/194, 99, 104, 121, 210/123, 151; 137/101.27, 101.29; 261/5, 6, 151

[56] References Cited
UNITED STATES PATENTS

| | | | |
|---|---|---|---|
| 3,717,251 | 2/1973 | Hampton | 210/104 X |
| 3,789,986 | 2/1974 | Oldham et al. | 210/121 |

*Primary Examiner*—Frank A. Spear, Jr.
*Attorney, Agent, or Firm*—Cain and Lobo

[57] ABSTRACT

A reservoir for the final treatment of sewage is provided with a fluid diverter, which is interconnected with and actuated by a float on the surface of the liquid collected in the reservoir. A submersible pump within the liquid recirculates liquid by spraying it through a foraminous header disposed above the liquid level. When the liquid level in the reservoir falls below a predetermined liquid level, the diverter permits the sprayed fluid to be returned to the reservoir. When the liquid level rises above the predetermined liquid level, the diverter diverts at least a portion of the fluid into the outlet pipe and continues to do so until the predetermined liquid level is restored.

10 Claims, 9 Drawing Figures

PIVOTABLE FLUID DIVERTER FOR RECIRCULATION SYSTEM

CROSS-REFERENCE TO RELATED APPLICATION

This application is a continuation-in-part of co-pending U.S. patent application Ser. No. 351,273 filed Apr. 16, 1973 now U.S. Pat. No. 3,789,986.

BACKGROUND OF THE INVENTION

This invention relates to improvements in sewage treatment systems, and, more particularly, to improvements in sewage treatment systems of the type in which a clear effluent is obtained by a finishing treatment of a sewage effluent stream which has previously been subjected to a primary and a secondary treatment.

In locations not served by municipal sewage systems, septic tanks, settling systems and other small scale sewage treatment systems are widely used. Separate sewage treatment systems for use, for example, for a house, small apartment complex, or the like, are becoming increasingly popular. Such systems commonly comprise a first settling tank for separating the solid matter from the sewage, a second tank where the sewage, both liquid and solid, is exposed to oxygen and decomposed by an aerobic action and a third tank for final separation by settling. The effluent from the third tank is not always as clear as it should be, and commonly has a minor proportion of solids and an objectionably high biochemical oxygen demand (BOD). It is desirable to treat such an effluent further, both to clarify it as well as to reduce its BOD.

Apparatus conventionally used for the finishing treatment of such an effluent commonly comprises a spray-recirculation tank in which the effluent is recirculated through a spray header to aerate, usually intermittently, and a separate filtration unit through which the aerated effluent is pumped. Such a two-unit system usually requires two pumps.

Another presently used system utilizes a single spray-recirculation tank containing the filtration unit. Incoming effluent is filtered through the filtration unit and a submersible pump spray-recirculates the filtered liquid, usually intermittently. An outlet for the effluent is located at a desired level usually about one foot from the bottom of the tank so as to maintain the liquid level at this height. The disadvantage of this system is that, except where the unit is located on an elevated embankment of the like, the outlet is several feet below the specified discharge level, and therefore, requires a second pump.

The apparatus of this invention combines the simplicity and economy of the single unit, and at the same time, obviates the cost and problems associated with a second pump. Moreover, the raised outlet of the tank permits an accumulation of a surge until such time as the pump should start up, thus permitting better aeration of the liquid in the tank. It will be recognized that where the outlet level, as in the prior art, is situated at the liquid level, any surging of liquid would immediately result in a flow of liquid from the tank.

SUMMARY OF THE INVENTION

It is, therefore, a general object of this invention to provide a new and improved treatment system for "finishing" effluent sewage generated in private dwellings and small clusters or complexes of private dwellings which do not have the benefit of a full-scale municipal sewage treatment plant.

It is another object of this invention to provide a new and improved means, for a fluid recirculation system having a reservoir, which is actuated by a predetermined level of liquid in the reservoir to divert at least a portion of the fluid being recirculated from the recirculation system.

Still further objects of this invention include the provision of a new and improved means for diverting a portion of recirculating fluid in a fluid recirculation system of having a reservoir which is responsive to a predetermined level of liquid in the reservoir to divert a portion of fluid from the recirculation system; which is useful in recirculating, aeration sewage treatment apparatus; which is float actuated; which discharges the diverted fluid through an outlet; which discharges the diverted fluid through an outlet disposed above the said predetermined liquid level; which includes a pivoted diverter means interconnected with and operated by a float means; which includes pivoted diverter means operated by a float and interconnected therewith by a member, which is substantially rigid in compression; which includes a pivoted diverter means operated by float means and interconnected therewith by a member which in tension; which is simple and foolproof in operation; which is economical to build and operate; which does not otherwise interfere significantly or materially with the normal operation of the recirculation systems; and which does not interfere materially with the aeration of any fluid not diverted which is to be aerated.

It is also the general object of the invention to provide a simple and rugged fluid diverter enclosed within an aeration tank and a float fixedly attached to the diverter in such a manner as to divert fluid out of the tank when there is an excessive accumulation of liquid in the tank, thus lowering the liquid level within the tank; when the liquid accumulation in the tank is insufficient, the diverter recirculates all of the liquid in the tank.

These and other objects, features and advantages of this invention will become apparent to those skilled in the art from the following description of preferred forms thereof, reference being had to the accompanying drawings and appended claims.

BRIEF DESCRIPTION OF THE DRAWINGS

The invention is illustrated in the accompanying drawings wherein.

In the figures of the drawing, like reference numerals are used to denote like parts. Some of the parts have been dimensionally exaggerated, for clarity of illustration and to facilitate the description of the operation of the apparatus.

DESCRIPTION OF THE PREFERRED EMBODIMENTS

Briefly, the treatment system of the apparatus and embodying this invention includes a reservoir, holding tank, or accumulator in which a predetermined liquid level is to be maintained within narrow limits. A filter bed of sand and other particular solid material is disposed within the reservoir above the level of liquid to be maintained. Effluent from a prior sewage treatment system is discharged onto the filter bed and percolates through it to collect in the reservoir directly below. A submersible pump lifts the liquid to a perforated header near the top of the reservoir, from which the liquid is sprayed to aerate the liquid.

Figure 1:
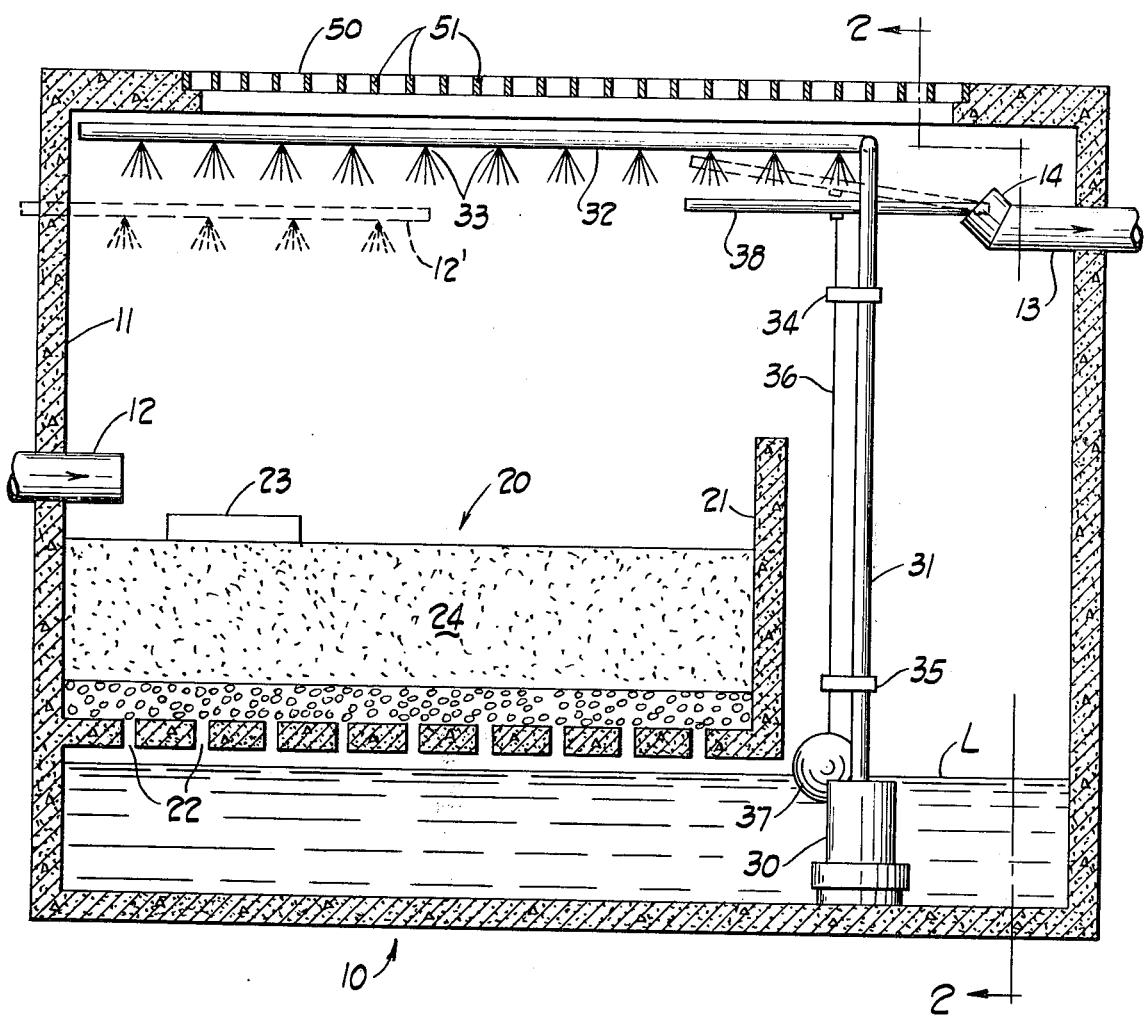
FIG. 1 is a front vertical sectional view of a treatment system for aeration and clarification of sewage, including a fluid diverter embodying a preferred form of this invention.
Figure 2:
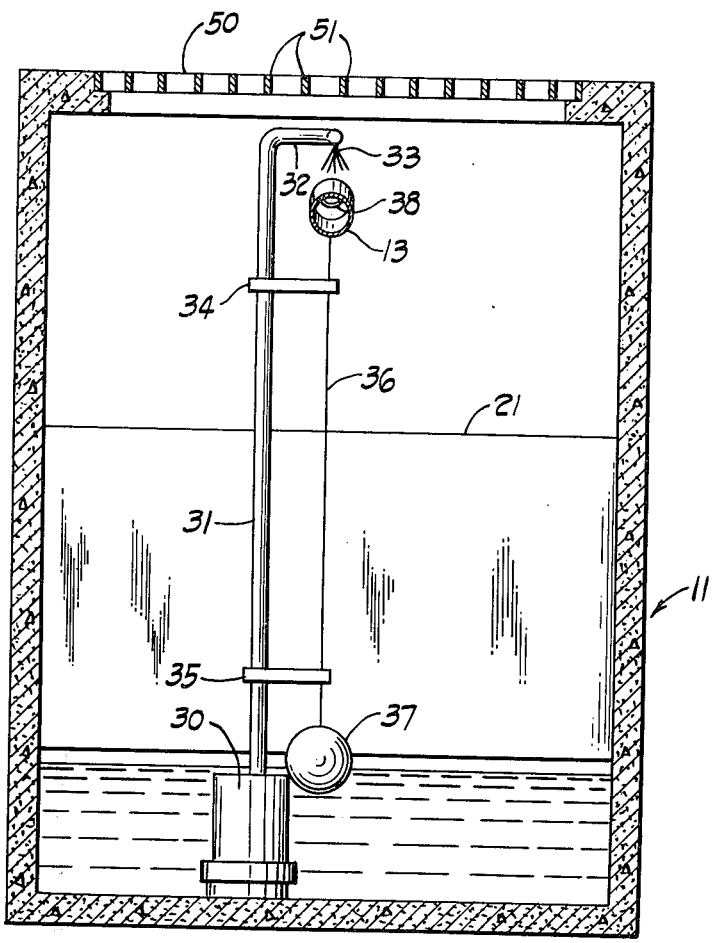
FIG. 2 is a side vertical sectional view of the apparatus of FIG. 1 taken along the line 2—2.

More particularly, as shown in FIGS. 1 and 2 of the accompanying drawing, the treament system embodying this invention is indicated generally at 10, and includes a reservoir or tank 11 provided with an inlet pipe 12 in one wall of the tank, and an outlet pipe 13 in another wall of the tank. As will be apparent from the description hereinafter, as long as the outlet pipe is above the desired level to be maintained in the reservoir, the disposition of the inlet and outlet pipes relative to each other is a matter of convenience rather than of critical importance. Where pressure considerations permit, it may be desirable to provide an inlet pipe 12′, shown in phantom view in FIG. 1, which is provided with suitable holes through which the incoming effluent may be sprayed into the reservoir thus giving it an initial aeration. Whether introduced into the reservoir through inlet pipe 12 or 12′, the incoming fluid is discharged upon a filter unit shown generally at 20 which includes a tray 21 containing successive layers of stone, coarse sand and fine sand to filter the incoming fluid, as is well known in the art. The tray 21 may be formed of any corrosion-resistant material, for example, concrete, glass-fiber-reinforced plastic, and the like. The tray is supported within the reservoir so the bottom of the tray is disposed above a desired predetermined liquid level L to be maintained during operation of the system. For economy, and ease of fabrication, particularly where the reservoir 11 is made of the same material as that chosen for tray 21, for example, concrete, the tray may be formed as an integral part of the reservoir projecting inwardly from the sides thereof as shown in FIG. 1. The bottom of tray 21 is provided with holes 22 through which incoming fluid percolates into the reservoir 11. Where an inlet pipe 12 is used, a slab 23 is placed atop the filter bed so as to break the force of incoming fluid, and, at the same time, to distribute the fluid over the surface of the filter bed.

Filtered liquid collects in the reservoir and continues to accumulate. A submersible pump 30 rests on the bottom of the reservoir 11, and in normal operation, is immersed by the filter liquid. The submersible pump serves to recirculate the liquid in the reservoir by pumping the liquid through a discharge line 31 which is in open fluid communication with a spraying means such as a spray header 32. In this embodiment, the spray header may be a piece of pipe closed at one end and provided with perforations or holes 33 or slots of suitable diameter, through which the recirculated liquid is sprayed. The spraying means may be of any known type, such as for example, a disc sprayer or multiple nozzles. For economy, however, an elongated foraminous conduit is preferred. The conduit may be of convenient shape having multiple orifices 33 disposed within the spraying means so as to enable a portion of the sprayed fluid to be selectively collected as will be described hereinafter. The submersible pump 30 may be operated by a conventional timing mechanism which may be set to spray-recirculate liquid for a predetermined interval of time, say 30 minutes every hour on the hour during periods when the sewage system is subjected to heavy loads, and for shorter intervals of time, say 15 minutes, during those periods as, for example late at night, when the sewage system is infrequently used, or "coasting". The particular intervals of spray-recirculation to oxygenate the liquid are chosen in proportion to the BOD of the liquid in the tank and the BOD desired in the effluent after it is treated.

An upper guide 34 and a lower guide 35 are fixedly disposed in vertical spaced apart relationship on the discharge line 31. A vertical rod 36 is slidably disposed within the upper and lower guides. The lower end of the rod is fixed to a float 37 which rests on the surface of the liquid in the reservoir. The other end of the rod is fixedly attached to a diverter or spray-collecting means, such as an elongated trough 38, open at both ends, preferably at a point intermediate the open ends. The rod 36 transmits the movement of the fluid 37 to the trough 38 so that trough may be raised or lowered about its pivot so as to divert liquid falling therein either back through the filter (i.e. recirculate it) or to divert it out through the outlet pipe 13. The length of the trough is so chosen as to place a portion of the trough under some of the holes 33 so as to receive liquid sprayed from those holes. The greater the number of holes from which the liquid is sprayed into the trough, the more rapidly does the trough divert liquid out of the reservoir. To facilitate adjusting the rate at which the liquid level may be restored, the trough 38 may be extensible.

Figure 3:
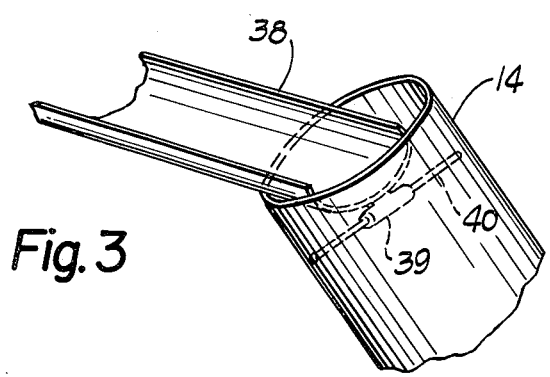
FIG. 3 is a fragmentary perspective view showing in enlarged detail a preferred manner of pivoting the fluid diverter shown in FIG. 1.
Figure 4:
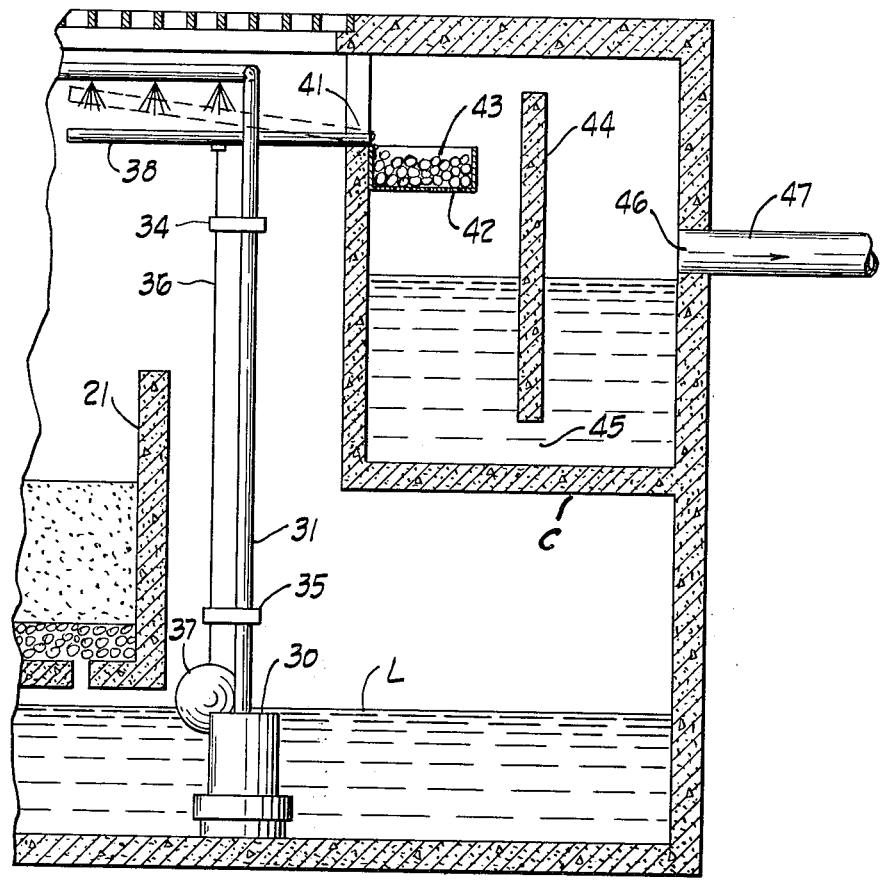
FIG. 4 is a side vertical sectional view of a portion of a system embodying the diverter shown in FIG. 1, equipped with a chlorine contact chamber.

As shown in FIG. 3, the outlet pipe 13 is preferably provided with an upturned portion 14 in which one end of the trough 38 is pivotally disposed. This may be effected by any pivot means such as pivot pins oppositely disposed in the upturned portion 14 of the outlet pipe 13. A preferred pivot means is a sleeve bearing 39 fixedly attached to one end of the trough and a rod 40 slidably disposed in the upturned portion 14 of the outlet pipe 13. The sleeve bearing 39 and the rod 40 are preferably made from corrosion resistant material which are also unaffected by bacterial growth. Aluminum and polyolefin synthetic resins are most preferred. The rod 36 is fixedly attached to the trough 38, at a point away from the pivot means, so as to selectively place at least a portion of the spray header 32 in open fluid communication with the outlet pipe. This occurs when the trough is inclined upwardly, about and from a horizontal plane through the rod 40, causing liquid in the trough to flow down into the outlet pipe. Alternately, the trough 38 is inclined downwardly from the horizontal plane causing liquid to flow down into the reservoir.

The purpose of recirculating the liquid retained in the tank 11 is to oxygenate the liquid thereby lowering its BOD. Oxygen is economically provided by air which enters the reservoir 11 through a grid 50 having multiple perforations 51. The perforations 51 are preferably large enough to permit easy access of air to and from the reservoir, and at the same time, small enough to prevent undesirable debris from drifting into the reservoir 11. The holes 51 are preferably in the range from about one-fourth inch to 1 inch in diameter. The grid 50 may be made from cast iron, cementitious material, or any corrosion-resistant material which has sufficient strength to function as a cover capable of withstanding the weight of a person, and at the same time, providing a screening function. The cover 50 may be recessed into the top of the reservoir 11 as shown, or be hingedly disposed thereupon for easy access to the interior of the reservoir.

In operation, it is desired to maintain the liquid within the reservoir 11 at a desired mean liquid level L. Incoming fluid from a prior sewage treatment system is introduced into the reservoir 11 through the inlet pipe 12 and is discharged upon the slab 23 and distributed over the surface of the filter bed 24. The fluid percolates through the filter bed and drains through holes 22 into the liquid below leaving the solids in the filter bed. The length of the vertical rod 36 is so chosen that when the liquid level is below the desired mean liquid level L, the trough is inclined downwardly from the horizontal plane through the rod 40 so that the end of the trough opposite to the pivoted end is tilted so as to discharge liquid from the trough into the reservoir. If desired the slab 23 may be extended to a position below the downwardly inclined trough to break the force of the discharged liquid and to aid in the distribution of the liquid over the filter bed. But when the liquid level rises above the desired mean liquid level L, the trough is inclined upwardly from a horizontal plane through the rod 40 so the stream from the trough is discharged into the outlet pipe 13. Thus, incoming effluent continues to be filtered through the filter unit 20 and continues to collect in the reservoir 11 until the predetermined mean liquid level L is exceeded, whereupon the float responsive means displaces the trough upwardly with respect to the pivoted end of the trough and a portion of the sprayed fluid is diverted into the outlet pipe. The upwardly inclined attitude of the trough is maintained until enough fluid has been discharged from the reservoir to lower the liquid level L. The float 37 on the liquid surface is lowered a like amount, changing the attitude of the trough 38 to a downward inclination and causing the liquid sprayed from the spraying means to be diverted into the reservoir.

It will be apparent that the pump 30 may be located outside the tank 10 and is not necessarily submerged within the liquid for the purposes of this invention. Similarly, it will be recognized that the trough 38 may be an extensible trough to accomodate units of different capacities and to permit varying the rate at which sprayed liquid may be collected and discharged from the tank.

It will also be recognized from the preferred embodiment described above that solids contained in the incoming fluid stream to be treated might eventually plug the filter bed 24. Should this occur, unfiltered fluid would escape over the side of the tray 21 and be eventually discharged from the reservoir without adequate filtration. Those skilled in the art will recognize that it is desirable to make periodic inspections of the quality of the effluent from the outlet pipe 13 to determine whether or not it has been satisfactorily treated. Alternatively, it is desirable to provide means to sense the quality of the fluid discharged from the outlet 13 and to indicate when this quality has regressed below an acceptable level. In some instances, it may be desirable to chlorinate aerated, recirculated liquid, by contacting the liquid with chlorine pellets in a contact chamber.

Such treatment is not expected, generally, to be necessary, but where it is desired, the reservoir 11 is provided with an integral contact chamber, shown generally at C, in the upper portion of the reservoir 11. The contact chamber C has an opening 41 in which the trough 38 is pivotally disposed. Any suitable means of pivoting the trough may be used, such as oppositely disposed pivot pins engaged in slots in the end of the trough, or any other means, substantially as described above. A tray 42 is fixedly disposed in the contact chamber C so as to receive liquid from the trough 38.

When the liquid level rises above the predetermined liquid level, the trough 38 discharges a preselected proportion of the liquid sprayed from the spraying means into a tray 42, preferably provided with plural drain holes. The tray 42 is stocked with chlorine pellets 43 which may be introduced into the tray in any suitable manner. The contact chamber C is provided with a partition or baffle 44 which serves to divide the chamber vertically into two compartments, in open communication with each other, through an opening 45 near the bottom. The partition 44 insures that aerated recirculated effluent is discharged from the trough 38 into contact with the chlorine pellets 43 and then held in the chamber C for sufficient time to provide an additional "leveling effect" with respect to surges to which the system is subjected.

Chlorinated liquid accumulates in the contact chamber and continues to accumulate until the level reaches the opening 46 through which the chlorinated liquid flows to outlet pipe 47 from which it is discharged from the system. It will be apparent that the opening 46 is lower than the opening 41, and below the tray 42. It will also be apparent that it is desirable to dispose the contact chamber as high as possible within the reservoir 11 so as not to sacrifice any more liquid head than is necessary.

Figure 5:
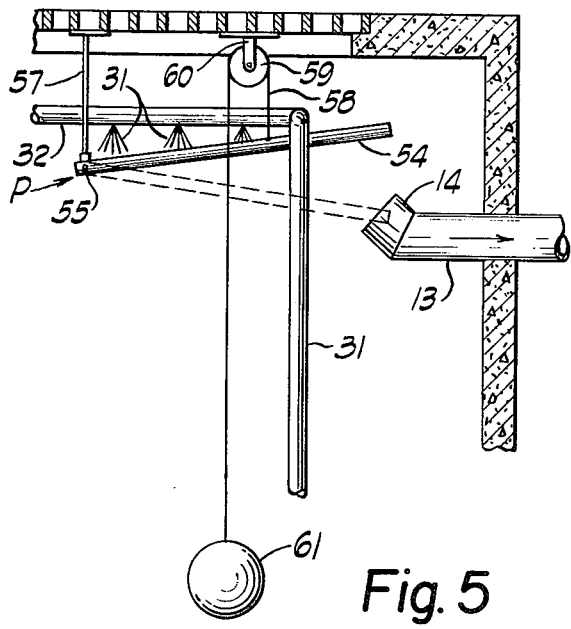
FIG. 5 is a broken view, otherwise similar to FIG. 1, showing another preferred form of this invention.
Figure 6:
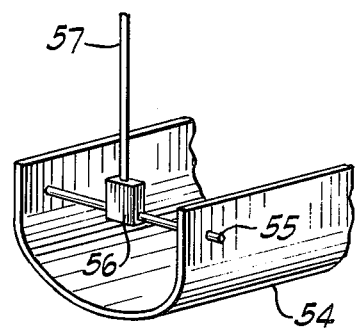
FIG. 6 is a detail perspective view, on an enlarged scale, of the pivot for the fluid diverter shown in FIG. 5.

In another embodiment as shown in FIG. 5, a trough is pivotedly supported by pivot means P near one end which is positioned so as to receive water sprayed from a predetermined number of spray means 33. As shown in FIG. 6, a preferred pivot means P comprises a rod 55 mounted in the trough, through opposed walls thereof, and the rod being rotatably disposed in a bushing 56. A hanger means or supporting strut 57 is supported, at one end, on the roof or other portion of the reservoir, and at the other end, is attached to the bushing 56, thus supporting the trough 54 near one end. It will be apparent from the description hereinafter that the position of the pivot P is not critical, provided that the desired pivotal movement of the trough is obtained, as described hereinafter.

The trough 54 is supported, intermediate its length, by a flexible support means or cable 58 which is trained around a pulley 59 supported from the roof or other convenient place of the reservoir by a hanger 60. The other end of the cable 58 is attached to a weighted float 61 which floats on the water in the reservoir. The weight of the float 61 is so chosen as to counterbalance the trough 54, in a position normally upwardly inclined from a generally horizontal plane through the rod 55, so that as long as the level of the water in the reservoir remains at or below a predetermined level L flow of water recirculated by the pump is directed back into the reservoir. When the water level rises above a predetermined level L, the float 61 is correspondingly raised and the trough 54 lowers under the influence and effect of gravity and the slack which would otherwise obtain in cable 58.

When the trough 54 is lowered below a generally horizontal plane through the rod 55, the trough is placed in open fluid communication with the upturned portion 14 of the outlet 13. The trough 54 is thus disposed in float-responsive relationship with the float 61, and a predetermined water level L is automatically maintained in the reservoir.

Figure 7:
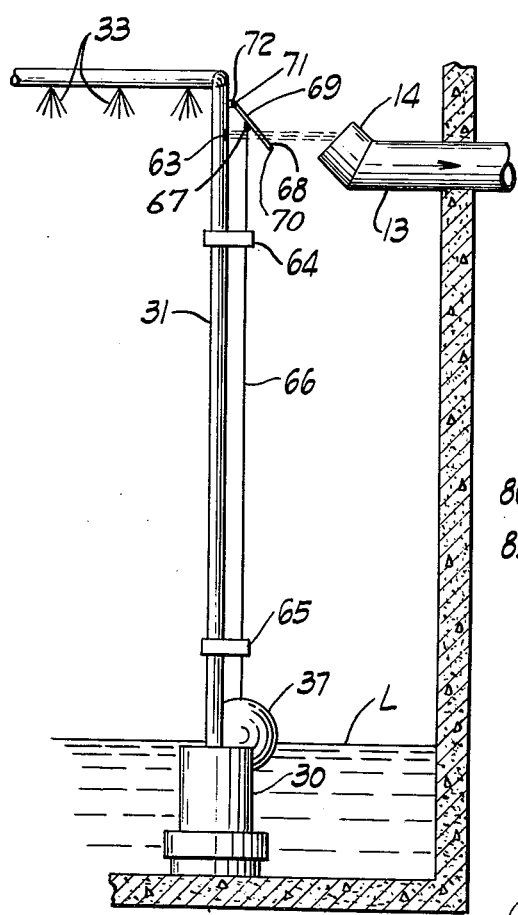
FIG. 7 is a broken view, otherwise similar to FIG. 1, showing still another preferred form of fluid diverter embodying this invention.

In another embodiment of the invention, shown in FIG. 7, the discharge line 31 is provided with an opening or orifice 63 through which a portion of the discharge is continuously ejected. If desired, a nozzle (not shown) may be threadedly disposed in the orifice 63 to aim the discharge more accurately. The area of the orifice 63 is determined by the rate at which an increase of the water level in the reservoir is to be returned to normal. The diameter of the orifice 63 is not critical and is generally chosen so as to provide a flow equivalent to the flow of about three orifices in the spray means 33.

Figure 8:
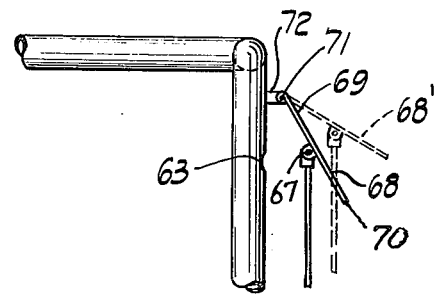
FIG. 8 is a detail view, on an enlarged scale, of the fluid diverter shown in FIG. 7.

The discharge line 31 is provided with guides 64 and 65 through which a rod 66 is attached to a float 37 which floats on the surface of the water in the reservoir. As shown in more detail in FIG. 8, the upper end of the rod 66 is attached, as at 67, to a diverter or flap 68, intermediate the upper edge 69 and lower edge of the flap 70. The flap 68 may be of any suitable configuration and of conventional corrosion-resistant material. The upper edge 69 of the flap is pivotedly disposed on pivot means 71 supported on a lug 72 attached to the discharge line 31. The width of the flap 68 is so chosen that the lower edge 70 is below the horizontal line through the orifice 63 when the level of water in the reservoir is at, or lower than, a predetermined liquid level L. In normal operation, water is discharged from the orifice 63 whenever the pump 30 is recirculating water. When the water level is at, or below, a predetermined liquid level L, the flap 68 is interposed between the orifice 63 and the outlet pipe 13 and returns the fluid back into the reservoir. The returned fluid splashes off the flap and is aerated as it falls back into the reservoir.

When the water level rises, the float 37 is raised, and correspondingly raises the lower edge 70 of the flap above the discharge orifice 63 as shown in phantom outline at 68', and water is discharged into the upturned portion of 14, the outlet pipe 13 which is so positioned as to accept and conduct the ejected stream of water discharged from the orifice 63, away from the reservoir.

Figure 9:
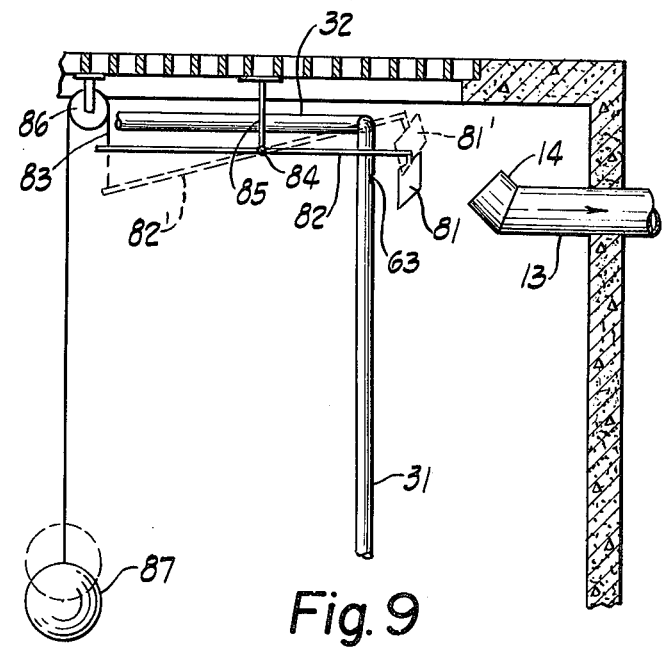
FIG. 9 is a broken view, otherwise similar to FIG. 1, showing still another preferred form of fluid diverter embodying this invention.

In yet another embodiment of the instant invention, there is shown in FIG. 9 the discharge line 31 having an orifice 63, which, as in the previous embodiment, permits a portion of the water discharged from the pump to escape, the remainder being sprayed through the spray header 32. A diverter means, or flap 81 is interferingly disposed, in its normal or lower position between the orifice 63 and the outlet pipe 13. The flap 81 is attached to one end of an arm 82, the other end of which is attached to one end of a flexible connecting means or cable 83. The arm 82 is pivotedly attached, intermediate its ends, by pivot means 84, to a hanger means or support strut 85 carried on the roof or other convenient portion of the reservoir. The other end of the cable 83 is trained around a pulley 86 supported on the roof or other portion of the reservoir and attached to a weighted float 87 which floats on the water in the reservoir. The weight of the float is so chosen as to counterbalance the downward force exerted on the one end of the cable 83 in such a manner that when the water level is at or below a predetermined level L, the diverter 81 is interferingly disposed between the orifice 63 and the upturned portion 14, of the outlet pipe 13. When the level of water rises above the level L, the weight of that portion of arm intermediate the pivot 84 and the end of the arm attached to the cable 83, urges this portion of the arm downward, thus inclining it as shown in phantom outline 82'. This serves to raise the diverter 81 to the position indicated in phantom as 81'. In this raised position, the diverter 81 does not interfere with a stream of liquid ejected from the orifice 63, which stream is directed into the open upturned portion 14 of the outlet 13. The level of water in the reservoir is thus maintained at the predetermined liquid level L by the float-responsive relationship of the diverter 81 and the float 87.

Modifications, changes and improvements to the preferred forms of the invention herein disclosed, described and illustrated may occur to those skilled in the art who come to understand the principles and precepts thereof. Accordingly, the scope of the patent to be issued herein should not be limited to the particular embodiments of the invention set forth herein, but rather should be limited by the advance by which the invention has promoted the art.

We claim:

1. A fluid diverter for maintaining the level of liquid at a predetermined level in a reservoir having (a) inlet means, (b) outlet means disposed above said predetermined liquid level by which liquid exits from said reservoir, (c) means in said reservoir for treating the liquid, and (d) a system for recirculating said liquid through said treatment means, said fluid diverter comprising diverter means for selectively directing the flow of a portion of said liquid being recirculated in said reservoir recirculating system through said outlet means, and means responsive to the level of liquid in said reservoir for controlling said diverter means to control the flow of at least a portion of said liquid being recirculated in said reservoir recirculation system, said diverter means causing flow of at least a portion of said liquid being recirculated in said reservoir recirculation system through said outlet means when said liquid level is greater than said predetermined level.

2. The fluid diverter according to claim 1 in which said liquid level responsive means is a float means, an axis is disposed above said predetermined liquid level, said diverter means is pivotably supported on said axis, and said fluid diverter includes means interconnecting said float means and diverter means for pivoting said diverter means about said axis in response to the level of said liquid.

3. The fluid diverter according to claim 2 in which said interconnecting means is attached to said diverter means in radially spaced relationship with said axis.

4. In a reservoir having outlet means for liquid, wherein a predetermined liquid level is to be maintained in said reservoir by recirculation of sprayed liquid through a spraying means disposed above said liquid level, the improvement comprising float responsive means disposed in said liquid, spray collection means pivotally supported at one end above said predetermined liquid level in vertically spaced apart relation with said float responsive means, means interconnecting said float responsive means with said spray collection means to selectively place a portion of said spray collection means in open fluid communication with said outlet means.

5. In a reservoir having inlet and outlet means, wherein a predetermined liquid level is to be maintained for fluid, and means for recirculating the fluid through a discharge line leading to a spraying means disposed above said liquid level, the improvement of fluid diverter means for diverting excess fluid through said outlet means, said fluid diverter means comprising float means disposed in said fluid and control means in float-responsive relationship with said float means for selective diversion of a predetermined portion of pumped fluid through said outlet means.

6. The fluid diverter means according to claim 5 wherein said control means comprises orifice means in said discharge line above said predetermined liquid level for diverting a portion of the fluid therefrom, said orifice and outlet means being so disposed relative to each other that said outlet means receives at least a portion of the fluid discharged through said orifice means, and means operable in response to said float means, and interposable between said orifice means and said outlet means to prevent flow of fluid into said outlet means when said fluid in said reservoir is below said predetermined liquid level.

7. The fluid diverter according to claim 6 wherein said last-named means is a plate means pivotally supported to have a first position intermediate said orifice and outlet means and in the path of said fluid flowing therebetween and a second position out of said path.

8. The fluid diverter according to claim 7 wherein said plate means is interconnected with said float means.

9. The fluid diverter according to claim 8 in which rod means interconnects said plate and float means.

10. The fluid diverter according to claim 5 including spray collection means disposed beneath at least a portion of said spraying means and having two ends, one of which is disposed in operative relationship with said outlet means, means supporting said spray collection means for pivoting about an axis, and means interconnecting said float means and said spray collection means, in fixed, longitudinally, spaced relation with said axis to selectively place said one end in open fluid communication with said outlet means in response to the level of said fluid in said reservoir as reflected by said float means.

* * * * *